United States Patent
Jawahar et al.

(10) Patent No.: US 11,029,993 B2
(45) Date of Patent: Jun. 8, 2021

(54) SYSTEM AND METHOD FOR A DISTRIBUTED KEY-VALUE STORE

(71) Applicant: Nutanix, Inc., San Jose, CA (US)

(72) Inventors: Anoop Jawahar, Bangalore (IN); Jaideep Singh, Karnataka (IN); Ronak Sisodia, Rajasthan (IN); Yasaswi Kishore, Bangalore (IN); Sandeep Madanala, Karnataka (IN); Rituparna Saikia, Bangalore (IN)

(73) Assignee: Nutanix, Inc., San Jose, CA (US)

( * ) Notice: Subject to any disclaimer, the term of this patent is extended or adjusted under 35 U.S.C. 154(b) by 0 days.

(21) Appl. No.: 16/518,931

(22) Filed: Jul. 22, 2019

(65) Prior Publication Data

US 2020/0319909 A1  Oct. 8, 2020

Related U.S. Application Data

(60) Provisional application No. 62/829,548, filed on Apr. 4, 2019.

(51) Int. Cl.
*G06F 9/455* (2018.01)

(52) U.S. Cl.
CPC .. *G06F 9/45558* (2013.01); *G06F 2009/4557* (2013.01); *G06F 2009/45579* (2013.01)

(58) Field of Classification Search
CPC ....... G06F 9/45558; G06F 2009/45579; G06F 2009/4557
See application file for complete search history.

(56) References Cited

U.S. PATENT DOCUMENTS

| | | |
|---|---|---|
| 6,209,128 B1 | 3/2001 | Gerard et al. |
| 6,775,673 B2 | 8/2004 | Mahalingam et al. |
| 7,653,668 B1 | 1/2010 | Shelat et al. |
| 8,019,732 B2 | 9/2011 | Paterson-Jones et al. |
| 8,166,128 B1 | 4/2012 | Faulkner et al. |
| 8,250,033 B1 | 8/2012 | De Souter et al. |
| 8,352,424 B2 | 1/2013 | Zunger et al. |
| 8,549,518 B1 | 10/2013 | Aron et al. |
| 8,554,724 B2 | 10/2013 | Zunger |
| 8,601,473 B1 | 12/2013 | Aron et al. |
| 8,849,759 B2 | 9/2014 | Bestler et al. |
| 8,850,130 B1 | 9/2014 | Aron et al. |

(Continued)

OTHER PUBLICATIONS

Cano, Ignacio, et al. "Curator: Self-Managing Storage for Enterprise Clusters" (Mar. 27, 2017), from https://www.usenix.org/conference/nsdi17/.

(Continued)

*Primary Examiner* — Dong U Kim
(74) *Attorney, Agent, or Firm* — Foley & Lardner LLP

(57) ABSTRACT

An apparatus includes a processor having programmed instructions to determine a container number of container instances to be deployed in a cluster based on compute resources and determine a node number of virtual nodes to be deployed in the cluster based on storage resources. The node number of virtual nodes includes a key-value store. Each of the node number of virtual nodes owns a corresponding key range of the key-value store. The processor has programmed instructions to distribute the node number of virtual nodes equally across the container number of container instances and deploy the container number of container instances.

20 Claims, 4 Drawing Sheets

(56) References Cited

U.S. PATENT DOCUMENTS

| | | | |
|---|---|---|---|
| 8,863,124 B1 | 10/2014 | Aron | |
| 8,930,693 B2 | 1/2015 | Holt et al. | |
| 9,009,106 B1 | 4/2015 | Aron et al. | |
| 9,043,372 B2 | 5/2015 | Makkar et al. | |
| 9,052,942 B1 | 6/2015 | Barber et al. | |
| 9,069,708 B2 | 6/2015 | Gill et al. | |
| 9,069,983 B1 | 6/2015 | Nijjar | |
| 9,336,132 B1 | 5/2016 | Aron et al. | |
| 9,652,265 B1 | 5/2017 | Narayanasamy et al. | |
| 9,747,287 B1 | 8/2017 | Bhardwaj et al. | |
| 9,772,866 B1 | 9/2017 | Aron et al. | |
| 9,805,054 B2 | 10/2017 | Davis et al. | |
| 10,003,650 B2 | 6/2018 | Shetty et al. | |
| 10,409,837 B1 | 9/2019 | Schmidt et al. | |
| 10,740,302 B2 | 8/2020 | Slik et al. | |
| 2003/0023587 A1 | 1/2003 | Dennis et al. | |
| 2006/0080646 A1 | 4/2006 | Aman | |
| 2011/0082962 A1 | 4/2011 | Horovitz et al. | |
| 2012/0096052 A1 | 4/2012 | Tolia et al. | |
| 2012/0331243 A1 | 12/2012 | Aho et al. | |
| 2013/0332608 A1* | 12/2013 | Shiga | G06F 9/5088 709/226 |
| 2015/0378767 A1 | 12/2015 | Tarasuk-Levin et al. | |
| 2016/0048408 A1 | 2/2016 | Madhu et al. | |
| 2016/0275125 A1 | 9/2016 | Drobychev et al. | |
| 2017/0075909 A1 | 3/2017 | Goodson et al. | |
| 2017/0109421 A1 | 4/2017 | Stearn et al. | |
| 2017/0242746 A1 | 8/2017 | King et al. | |
| 2017/0351450 A1 | 12/2017 | Brandl et al. | |
| 2018/0292999 A1* | 10/2018 | Nadkarni | G06F 3/0631 |
| 2019/0004863 A1* | 1/2019 | Mainau | G06F 9/505 |
| 2019/0050296 A1 | 2/2019 | Luo et al. | |
| 2019/0213179 A1 | 7/2019 | McHugh et al. | |
| 2020/0036787 A1 | 1/2020 | Gupta et al. | |

OTHER PUBLICATIONS

Configure a Pod to Use a ConfigMap https://kubernetes.io/docs/tasks/configure-pod-container/configure-pod-configmap/, (Oct. 2, 2019).

Deployments https://kubernetes.io/docs/concepts/workloads/controllers/deployment/, (Oct. 2, 2019).

Poitras, Steven. "The Nutanix Bible" (Jan. 11, 2014), from http://stevenpoitras.com/the-nutanix-bible/ (Publication date based on indicated capture date by Archive.org; first publication date unknown).

Poitras, Steven. "The Nutanix Bible" (Jan. 12, 2016), from https://nutanixbible.com/.

Poitras, Steven. "The Nutanix Bible" (Oct. 15, 2013), from http://stevenpoitras.com/the-nutanix-bible/ (Publication date based on indicated capture date by Archive.org; first publication date unknown).

Poitras, Steven. "The Nutanix Bible" (Jun. 20, 2014), from http://stevenpoitras.com/the-nutanix-bible/ (Publication date based on indicated capture date by Archive.org; first publication date unknown).

Poitras, Steven. "The Nutanix Bible" (Jun. 25, 2018), from https://nutanixbible.com/.

Poitras, Steven. "The Nutanix Bible" (Jan. 3, 2017), from https://nutanixbible.com/.

Poitras, Steven. "The Nutanix Bible" (Jan. 3, 2018), from https://nutanixbible.com/.

Poitras, Steven. "The Nutanix Bible" (Sep. 4, 2015), from https://nutanixbible.com/.

Poitras, Steven. "The Nutanix Bible" (Jan. 7, 2015), from http://stevenpoitras.com/the-nutanix-bible/ (Publication date based on indicated capture date by Archive.org; first publication date unknown).

Poitras, Steven. "The Nutanix Bible" (Jan. 8, 2019), from https://nutanixbible.com/.

Poitras, Steven. "The Nutanix Bible" (Jun. 8, 2017), from https://nutanixbible.com/.

Poitras, Steven. "The Nutanix Bible" (Jun. 9, 2015), from http://stevenpoitras.com/the-nutanix-bible/ (Publication date based on indicated capture date by Archive.org; first publication date unknown).

Poitras, Steven. "The Nutanix Bible" (Jun. 9, 2016), from https://nutanixbible.com/.

Volumes https://kubernetes.io/docs/concepts/storage/volumes/, (Oct. 2, 2019).

"Creating an NFS file share"; AWS Storage Gateway—User Guide; https://docs.aws.amazon.com/storagegateway/latest/userguide/CreatingAnNFSFileShare.html; webpage accessed on Oct. 28, 2020; pp. 1-10.

"SwiftOnFile"; Object Storage—Gluster Docs; v: release3.7.0beta1; https://staged-gluster-docs.readthedocs.io/en/release3.7.0beta1/Administrator%20Guide/Object%20Storage/; webpage accessed on Oct. 28, 2020; pp. 1-2.

Michael Bose; "A Guide on How to Mount Amazon S3 as a Drive for Cloud File Sharing"; Nakivo Blog-Cloud-Backup to Cloud; https://www.nakivo.com/blog/mount-amazon-s3-as-a-drive-how-to-guide/; Published Jun. 17, 2020; pp. 1-27.

"Adding Objects to Versioning—Enabled Buckets", from https://docs.aws.amazon.com/AmazonS3/latest/dev/AddingObjectstoVersioningEnabledBuckets.html, (Oct. 2, 2019).

"Retrieving Object Versions", from https://docs.aws.amazon.com/AmazonS3/latest/dev/RetrievingObjectVersions.html, (Oct. 2, 2019).

"Setup Cluster Federation with Kubefed—Kubernetes", from https://v1-14.docs.kubernetes.io/docs/tasks/federation/set-up-cluster-federation-kubefed/, (Apr. 17, 2020).

B Tree Indexes. http://web.csulb.edu/-amonge/classes/common/db/B TreeIndexes.html, Aug. 4, 2018, pp. 1-7 (2018).

Stopford. Log Structured Merge Trees. http:I/www.benstopford.com/2015/02/14/ log-structured-merge-trees, 2015, pp. 1-8 (2015).

* cited by examiner

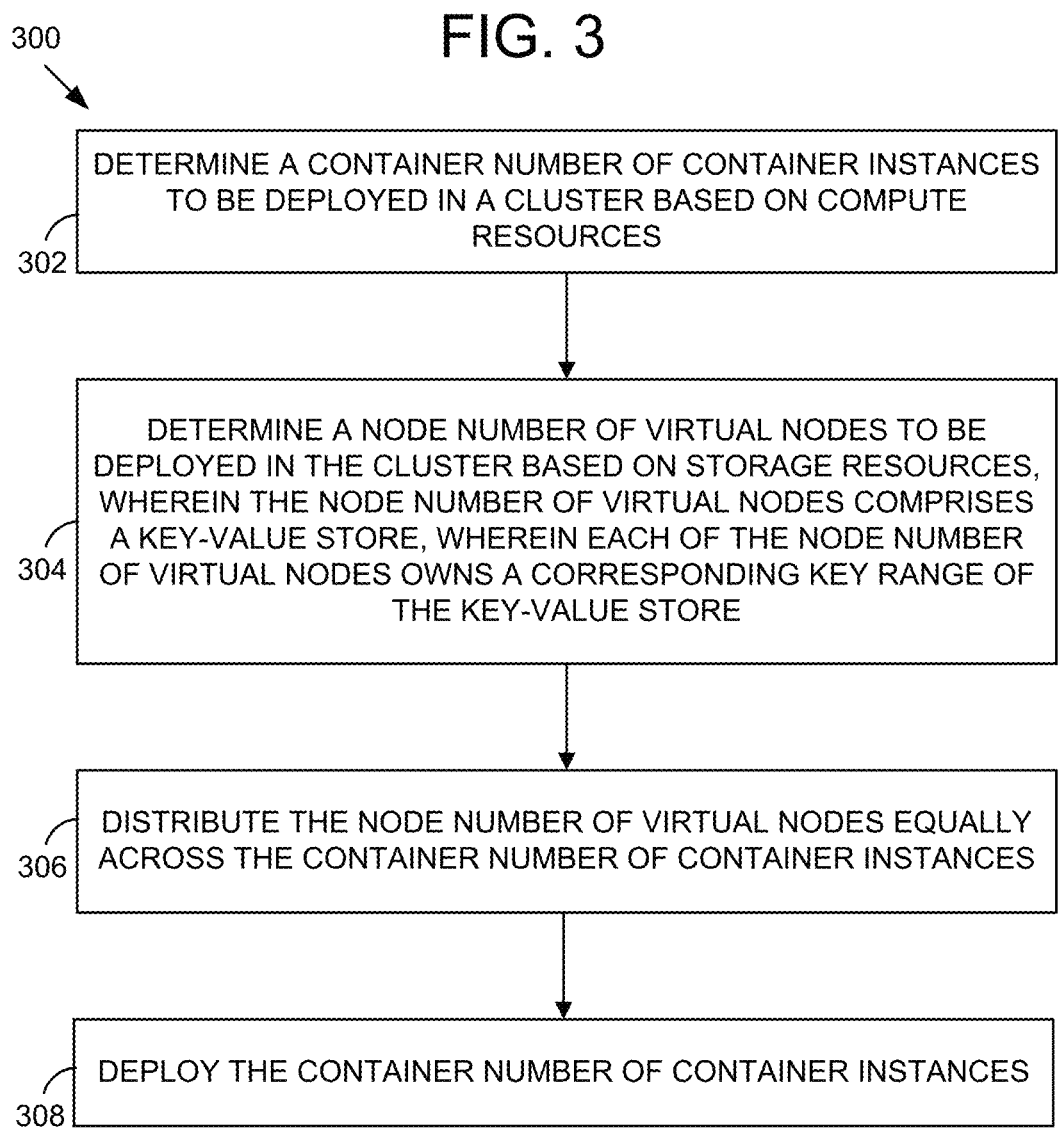

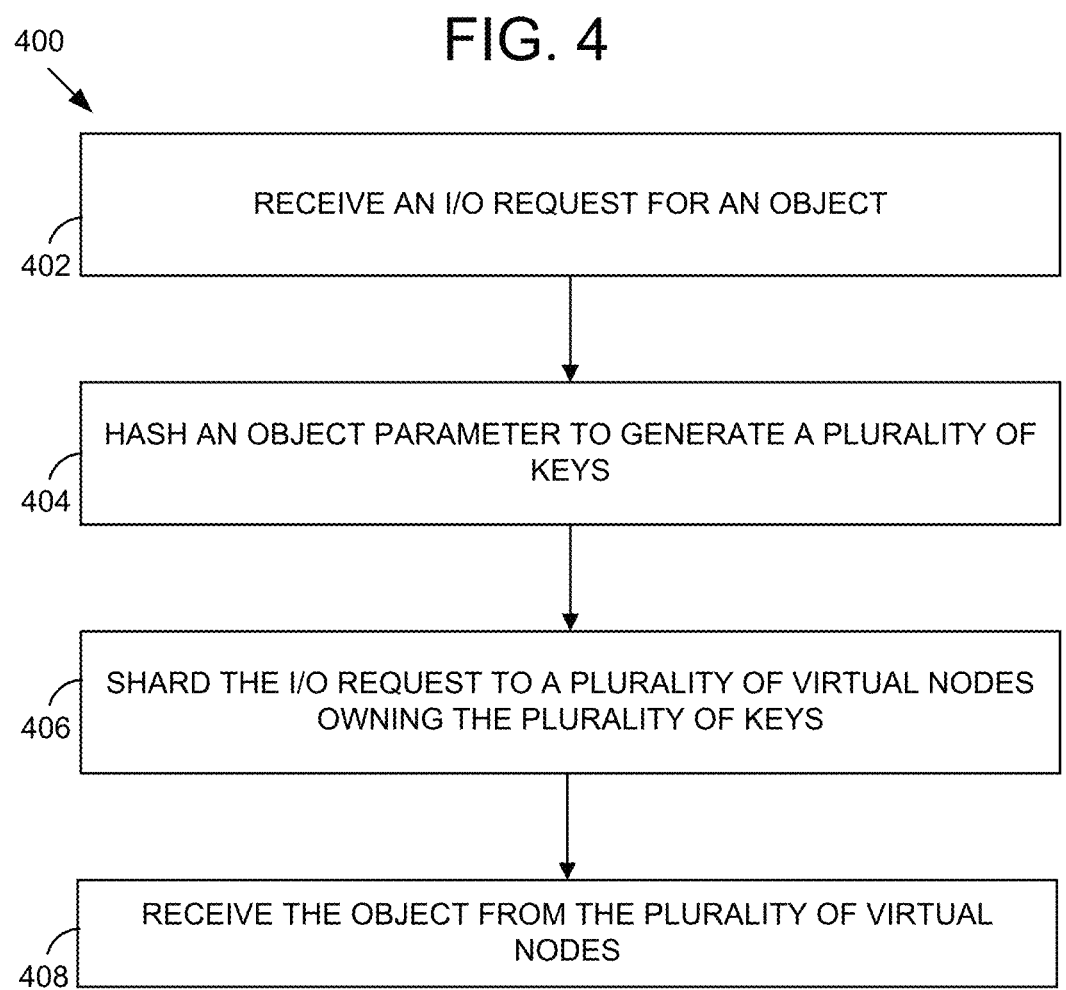

SYSTEM AND METHOD FOR A DISTRIBUTED KEY-VALUE STORE

CROSS-REFERENCE TO RELATED APPLICATION

This application is related to and claims priority under 35 U.S. § 119(e) from U.S. Patent Application No. 62/829,548, filed Apr. 4, 2019, titled "SYSTEM AND METHOD FOR A DISTRIBUTED KEY-VALUE STORE," the entire contents of which are incorporated herein by reference for all purposes.

BACKGROUND

The following description is provided to assist the understanding of the reader. None of the information provided or references cited is admitted to be prior art.

Virtual computing systems are widely used in a variety of applications. Virtual computing systems include one or more host machines running one or more virtual machines concurrently. The virtual machines utilize the hardware resources of the underlying host machines. Each virtual machine may be configured to run an instance of an operating system. Modern virtual computing systems allow several operating systems and several software applications to be safely run at the same time on the virtual machines of a single host machine, thereby increasing resource utilization and performance efficiency. However, the present-day virtual computing systems have limitations due to their configuration and the way they operate.

SUMMARY

Aspects of the present disclosure relate generally to a virtualization environment, and more particularly to a system and method for a distributed key-value store.

An illustrative embodiment disclosed herein is an apparatus including a processor having programmed instructions to determine a container number of container instances to be deployed in a cluster based on compute resources and determine a node number of virtual nodes to be deployed in the cluster based on storage resources. The node number of virtual nodes includes a key-value store. Each of the node number of virtual nodes owns a corresponding key range of the key-value store. The processor has programmed instructions to distribute the node number of virtual nodes equally across the container number of container instances and deploy the container number of container instances.

Another illustrative embodiment disclosed herein is a non-transitory computer readable storage medium having instructions stored thereon that, upon execution by a processor, causes the processor to perform operations including determining a container number of container instances to be deployed in a cluster based on compute resources and determining a node number of virtual nodes to be deployed in the cluster based on storage resources. The node number of virtual nodes comprises a key-value store. Each of the node number of virtual nodes owns a corresponding key range of the key-value store. The operations include distributing the node number of virtual nodes equally across the container number of container instances and deploying the container number of container instances.

Another illustrative embodiment disclosed herein is a computer-implemented method including determining, by a processor, a container number of container instances to be deployed in a cluster based on compute resources and determining, by the processor, a node number of virtual nodes to be deployed in the cluster based on storage resources. The node number of virtual nodes comprises a key-value store. Each of the node number of virtual nodes owns a corresponding key range of the key-value store. The method includes distributing, by the processor, the node number of virtual nodes equally across the container number of container instances and deploying, by the processor, the container number of container instances.

Further details of aspects, objects, and advantages of the invention are described below in the detailed description, drawings, and claims. Both the foregoing general description and the following detailed description are exemplary and explanatory and are not intended to be limiting as to the scope of the invention. Particular embodiments may include all, some, or none of the components, elements, features, functions, operations, or steps of the embodiments disclosed above. The subject matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIG. 3 is an example method for creating a key-value store cluster, in accordance with some embodiments of the present disclosure.

FIG. 4 is an example method for distributing an I/O request across multiple virtual nodes, in accordance with some embodiments of the present disclosure.

Figure 1:
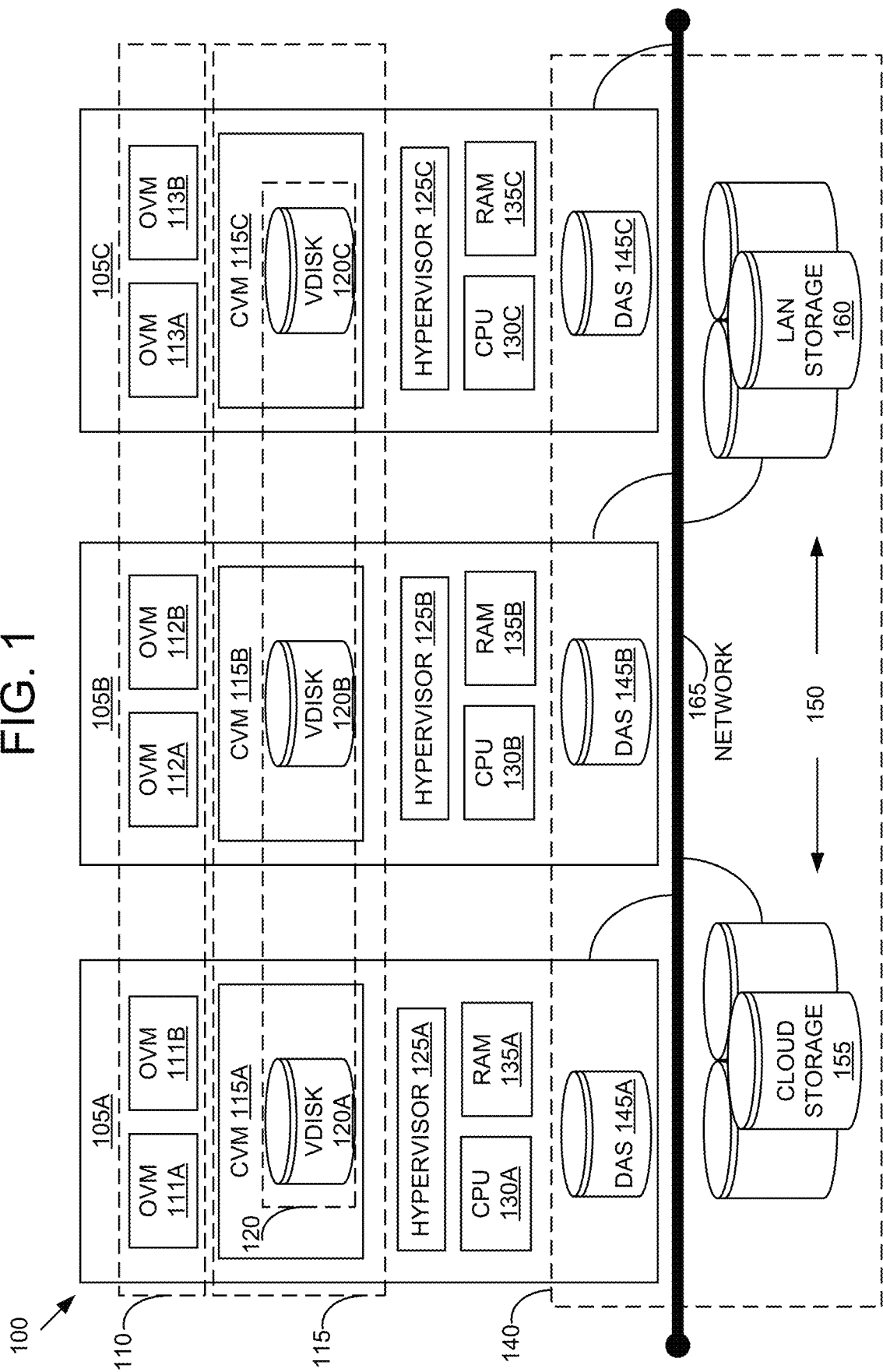
FIG. 1 is an example block diagram of a virtual computing system, in accordance with some embodiments of the present disclosure.

The foregoing and other features of the present disclosure will become apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

In conventional distributed key-value storage systems, the storage resources and compute resources are allocated by one system. Thus, the conventional systems are not scalable. Conventional systems also cannot adapt to different workloads. Furthermore, conventional systems cannot leverage features optimized for storage and at the same time leverage other features optimized for processing. Thus, independently handling compute resources and storage resources presents a technical problem. Likewise, conventional distributed key-value storage systems have a tightly coupled data plane and control plane. What is needed is an independently scalable data plane and control plane.

Described herein is directed to systems and methods for a distributed key-value store that decouples storage resources from compute resources. The compute resources are provided by a cluster manager and the storage resources are provided by a distributed storage platform. Some embodiments of the present disclosure determine a number of virtual nodes backed by virtual disks. Some embodiments of the present disclosure distribute the virtual nodes across multiple container instances and deploy the container instances.

Some embodiments of the present disclosure describes a technical solution to the technical problem of independently handling compute resources and storage resources. The present disclosure describes embodiments that can scale the storage resources independently from the compute resources. The present disclosure describes embodiments that can adapt across different kinds of workloads. The present disclosure describes embodiments that can leverage features provided by the distributed storage platform such as replication, consistency, fault tolerance, high availability, deduplication, compression, and erasure coding for disks on which the distributed key-value store stores data. The present disclosure describes embodiments that leverage features provided by the container manager such as high availability and fault tolerance for compute and memory resources. Some embodiments of the present disclosure provides a technical solution to the technical problem of decoupling the data plane and the control plane. In some embodiments of the present disclosure, the container instances and the corresponding virtual nodes are responsible for serving input/output (I/O) requests of the underlying data, while the cluster manager is responsible for control operations such as creating a new cluster or adding or removing a container instance.

Object Virtualization Technology and Environment

Referring now to FIG. 1, a virtual computing system 100 is shown, in accordance with some embodiments of the present disclosure. The virtual computing system 100 includes a plurality of nodes, such as a first node 105A, a second node 105B, and a third node 105C. The nodes may be collectively referred to herein as "nodes 105." Each of the nodes 105 may also be referred to as a "host" or "host machine." The first node 105A includes an object virtual machine ("OVMs") 111A and 111B (collectively referred to herein as "OVMs 111"), a controller virtual machine ("CVM") 115A, and a hypervisor 125A. Similarly, the second node 105B includes OVMs 112A and 112B (collectively referred to herein as "OVMs 112"), a CVM 115B, and a hypervisor 125B, and the third node 105C includes OVMs 113A and 113B (collectively referred to herein as "OVMs 113"), a CVM 115C, and a hypervisor 125C. The OVMs 111, 112, and 113 may be collectively referred to herein as "OVMs 110." The CVMs 115A, 115B, and 115C may be collectively referred to herein as "CVMs 115." The nodes 105 are connected to a network 165.

The virtual computing system 100 also includes a storage pool 140. The storage pool 140 may include network-attached storage (NAS) 150 and direct-attached storage (DAS) 145A, 145B, and 145C (collectively referred to herein as DAS 145). The NAS 150 is accessible via the network 165 and, in some embodiments, may include cloud storage 155, as well as local area network ("LAN") storage 160. In contrast to the NAS 150, which is accessible via the network 165, each of the DAS 145A, the DAS 145B, and the DAS 145C includes storage components that are provided internally within the first node 105A, the second node 105B, and the third node 105C, respectively, such that each of the first, second, and third nodes may access its respective DAS without having to access the network 165.

The CVM 115A may include one or more virtual disks ("vdisks") 120A, the CVM 115B may include one or more vdisks 120B, and the CVM 115C may include one or more vdisks 120C. The vdisks 120A, the vdisks 120B, and the vdisks 120C are collectively referred to herein as "vdisks 120." The vdisks 120 may be a logical representation of storage space allocated from the storage pool 140. Each of the vdisks 120 may be located in a memory of a respective one of the CVMs 115. The memory of each of the CVMs 115 may be a virtualized instance of underlying hardware, such as the RAMs 135 and/or the storage pool 140. The virtualization of the underlying hardware is described below.

In some embodiments, the CVMs 115 may be configured to run a distributed operating system in that each of the CVMs 115 run a subset of the distributed operating system. In some such embodiments, the CVMs 115 form one or more Nutanix Operating System ("NOS") cluster. In some embodiments, the one or more NOS clusters include greater than or fewer than the CVMs 115. In some embodiments, each of the CVMs 115 run a separate, independent instance of an operating system. In some embodiments, the one or more NOS clusters may be referred to as a storage layer.

In some embodiments, the OVMs 110 form an OVM cluster. OVMs of an OVM cluster may be configured to share resources with each other. The OVMs in the OVM cluster may be configured to access storage from the NOS cluster using one or more of the vdisks 120 as a storage unit. The OVMs in the OVM cluster may be configured to run software-defined object storage service, such as Nutanix Buckets™. The OVM cluster may be configured to create buckets, add objects to the buckets, and manage the buckets and objects. In some embodiments, the OVM cluster include greater than or fewer than the OVMs 110.

Multiple OVM clusters and/or multiple NOS clusters may exist within a given virtual computing system (e.g., the virtual computing system 100). The one or more OVM clusters may be referred to as a client layer or object layer. The OVM clusters may be configured to access storage from multiple NOS clusters. Each of the OVM clusters may be configured to access storage from a same NOS cluster. A central management system, such as Prism Central, may manage a configuration of the multiple OVM clusters and/or multiple NOS clusters. The configuration may include a list of OVM clusters, a mapping of each OVM cluster to a list of NOS clusters from which the OVM cluster may access storage, and/or a mapping of each OVM cluster to a list of vdisks that the OVM cluster owns or has access to.

Each of the OVMs 110 and the CVMs 115 is a software-based implementation of a computing machine in the virtual computing system 100. The OVMs 110 and the CVMs 115 emulate the functionality of a physical computer. Specifically, the hardware resources, such as CPU, memory, storage, etc., of a single physical server computer (e.g., the first node 105A, the second node 105B, or the third node 105C) are virtualized or transformed by the respective hypervisor (e.g. the hypervisor 125A, the hypervisor 125B, and the hypervisor 125C), into the underlying support for each of the OVMs 110 and the CVMs 115 that may run its own operating system, a distributed operating system, and/or applications on the underlying physical resources just like a real computer. By encapsulating an entire machine, including CPU, memory, operating system, storage devices, and network devices, the OVMs 110 and the CVMs 115 are compatible with most standard operating systems (e.g. Windows, Linux, etc.), applications, and device drivers. Thus, each of the hypervisors 125 is a virtual machine monitor that allows the single physical server computer to run multiple instances of the OVMs 110 (e.g. the OVM 111) and at least one instance of a CVM 115 (e.g. the CVM 115A), with each of the OVM instances and the CVM instance sharing the resources of that one physical server computer, potentially across multiple environments. By running the multiple instances of the OVMs 110 on a node of the nodes 105, multiple workloads and multiple operating systems may be run on the single piece of underlying hardware computer to increase resource utilization and manage workflow.

The hypervisors 125 of the respective nodes 105 may be configured to run virtualization software, such as, ESXi from VMWare, AHV from Nutanix, Inc., XenServer from Citrix Systems, Inc., etc. The virtualization software on the hypervisors 125 may be configured for managing the interactions between the respective OVMs 110 (and/or the CVMs 115) and the underlying hardware of the respective nodes 105. Each of the CVMs 115 and the hypervisors 125 may be configured as suitable for use within the virtual computing system 100.

In some embodiments, each of the nodes 105 may be a hardware device, such as a server. For example, in some embodiments, one or more of the nodes 105 may be an NX-1000 server, NX-3000 server, NX-5000 server, NX-6000 server, NX-8000 server, etc. provided by Nutanix, Inc. or server computers from Dell, Inc., Lenovo Group Ltd. or Lenovo PC International, Cisco Systems, Inc., etc. In other embodiments, one or more of the nodes 105 may be another type of hardware device, such as a personal computer, an input/output or peripheral unit such as a printer, or any type of device that is suitable for use as a node within the virtual computing system 100. In some embodiments, the virtual computing system 100 may be part of a data center.

The first node 105A may include one or more central processing units ("CPUs") 130A, the second node 105B may include one or more CPUs 130B, and the third node 105C may include one or more CPUs 130C. The CPUs 130A, 130B, and 130C are collectively referred to herein as the CPUs 130. The CPUs 130 may be configured to execute instructions. The instructions may be carried out by a special purpose computer, logic circuits, or hardware circuits of the first node 105A, the second node 105B, and the third node 105C. The CPUs 130 may be implemented in hardware, firmware, software, or any combination thereof. The term "execution" is, for example, the process of running an application or the carrying out of the operation called for by an instruction. The instructions may be written using one or more programming language, scripting language, assembly language, etc. The CPUs 130, thus, execute an instruction, meaning that they perform the operations called for by that instruction.

The first node 105A may include one or more random access memory units ("RAM") 135A, the second node 105B may include one or more RAM 135B, and the third node 105C may include one or more RAM 135C. The RAMs 135A, 135B, and 135C are collectively referred to herein as the RAMs 135. The CPUs 130 may be operably coupled to the respective one of the RAMs 135, the storage pool 140, as well as with other elements of the respective ones of the nodes 105 to receive, send, and process information, and to control the operations of the respective underlying node. Each of the CPUs 130 may retrieve a set of instructions from the storage pool 140, such as, from a permanent memory device like a read only memory ("ROM") device and copy the instructions in an executable form to a temporary memory device that is generally some form of random access memory ("RAM"), such as a respective one of the RAMs 135. One of or both of the ROM and RAM be part of the storage pool 140, or in some embodiments, may be separately provisioned from the storage pool. The RAM may be stand-alone hardware such as RAM chips or modules. Further, each of the CPUs 130 may include a single stand-alone CPU, or a plurality of CPUs that use the same or different processing technology.

Each of the DAS 145 may include a variety of types of memory devices. For example, in some embodiments, one or more of the DAS 145 may include, but is not limited to, any type of RAM, ROM, flash memory, magnetic storage devices (e.g., hard disk, floppy disk, magnetic strips, etc.), optical disks (e.g., compact disk ("CD"), digital versatile disk ("DVD"), etc.), smart cards, solid state devices, etc. Likewise, the NAS 150 may include any of a variety of network accessible storage (e.g., the cloud storage 155, the LAN storage 160, etc.) that is suitable for use within the virtual computing system 100 and accessible via the network 165. The storage pool 140, including the NAS 150 and the DAS 145, together form a distributed storage system configured to be accessed by each of the nodes 105 via the network 165, one or more of the OVMs 110, one or more of the CVMs 115, and/or one or more of the hypervisors 125.

Each of the nodes 105 may be configured to communicate and share resources with each other via the network 165, including the respective one of the CPUs 130, the respective one of the RAMs 135, and the respective one of the DAS 145. For example, in some embodiments, the nodes 105 may communicate and share resources with each other via one or more of the OVMs 110, one or more of the CVMs 115, and/or one or more of the hypervisors 125. One or more of the nodes 105 may be organized in a variety of network topologies.

The network 165 may include any of a variety of wired or wireless network channels that may be suitable for use within the virtual computing system 100. For example, in some embodiments, the network 165 may include wired connections, such as an Ethernet connection, one or more twisted pair wires, coaxial cables, fiber optic cables, etc. In other embodiments, the network 165 may include wireless connections, such as microwaves, infrared waves, radio waves, spread spectrum technologies, satellites, etc. The network 165 may also be configured to communicate with another device using cellular networks, local area networks, wide area networks, the Internet, etc. In some embodiments, the network 165 may include a combination of wired and wireless communications.

Although three of the plurality of nodes (e.g., the first node 105A, the second node 105B, and the third node 105C) are shown in the virtual computing system 100, in other embodiments, greater than or fewer than three nodes may be used. Likewise, although only two of the OVMs are shown on each of the first node 105A (e.g. the OVMs 111), the second node 105B, and the third node 105C, in other embodiments, greater than or fewer than two OVMs may reside on some or all of the nodes 105.

It is to be understood again that only certain components and features of the virtual computing system 100 are shown and described herein. Nevertheless, other components and features that may be needed or desired to perform the functions described herein are contemplated and considered within the scope of the present disclosure. It is also to be understood that the configuration of the various components of the virtual computing system 100 described above is only an example and is not intended to be limiting in any way. Rather, the configuration of those components may vary to perform the functions described herein.

Distributed Key-Value Store

Figure 2:
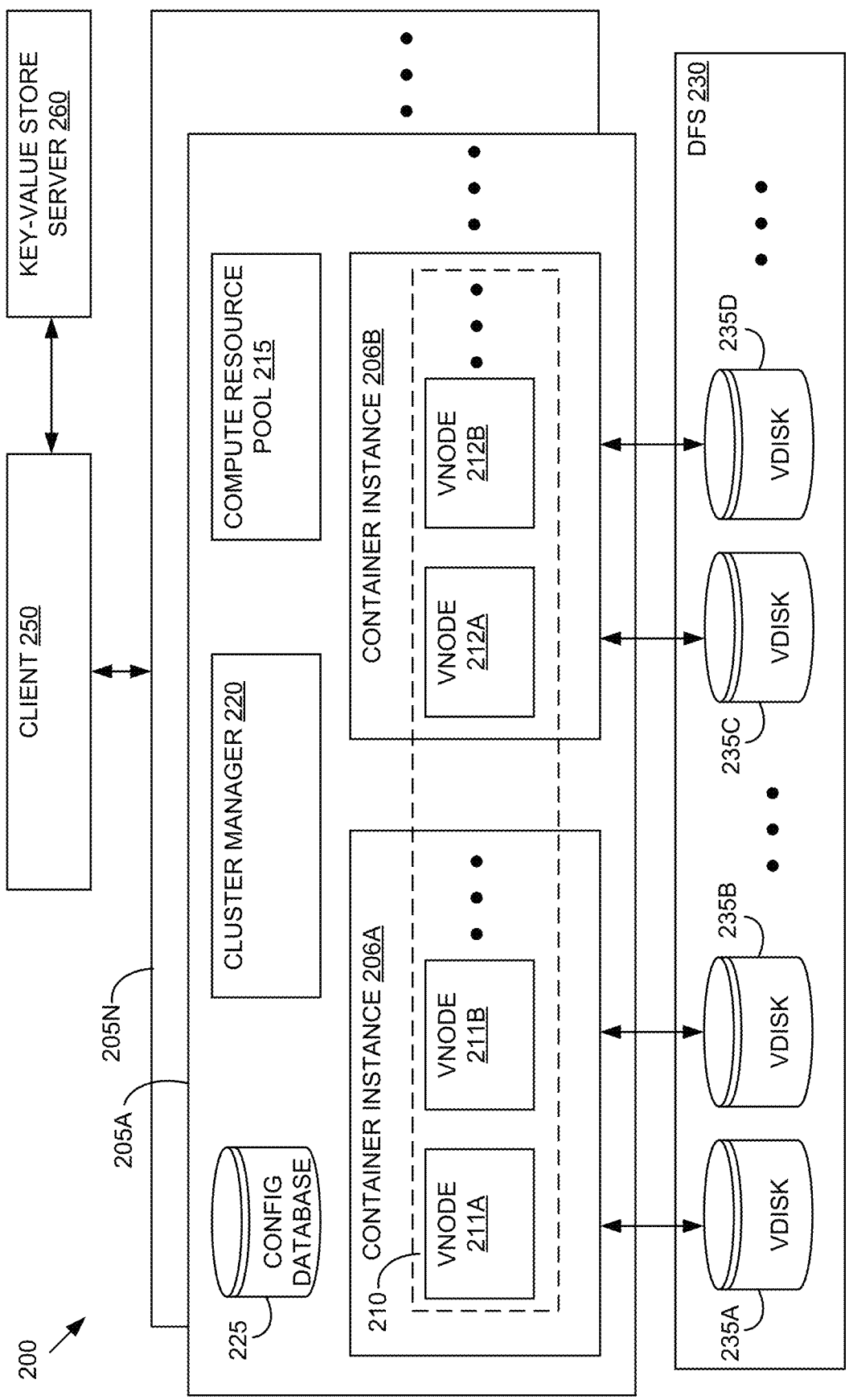
FIG. 2 is an example block diagram of a distributed key-value store, in accordance with some embodiments of the present disclosure.

Referring now to FIG. 2, an example embodiment of a distributed key-value store 200 is shown. In brief overview, the distributed key-value store 200 includes a plurality of distributed key-value store clusters 205A-N (generally referred to as a distributed key-value store cluster 205). Each distributed key-value store cluster 205 includes a container instance 206A and a container instance 206B. The container instance 206A includes a virtual node (vnode) 211A and a vnode 211B. The container instance 206B includes a vnode 212A and a vnode 212B. The distributed key-value store 200 further includes a resource pool 215, a cluster manager 220, and a configuration (config) database 225. The distributed key-value store 200 includes a distributed file system (DFS) 230. The DFS 230 includes a vdisk 235A and a vdisk 235B coupled to the container instance 206A, and a vdisk 235C and a vdisk 235D coupled to the container instance 206B. The distributed key-value store 200 may be coupled to a client 250. The client 250 may be coupled to a key-value store server 260.

The container store instances 206A and 206B may be collectively referred to herein as "container store instances 206." The vnodes 211A and 211B may be collectively referred to herein as "vnodes 211." The vnodes 212A and 212B may be collectively referred to herein as "vnodes 212." The vnodes 211 and 212 may be collectively referred to herein as "vnodes 210." The vdisks 235A-D may be collectively referred to herein as "vdisks 235."

Each of the elements or entities of the virtual computing system 100 and the distributed key-value store 200 (e.g. the container store instances 206, the vnodes 210, the resource pool 215, the cluster manager 220, the config database 225, the vdisks 235, the client 250, and the key-value store server 260), is implemented using hardware or a combination of hardware or software, in one or more embodiments. For instance, each of these elements or entities can include any application, program, library, script, task, service, process or any type and form of executable instructions executing on hardware of the virtual computing system 100, and/or the distributed key-value store 200. The hardware includes circuitry such as one or more processors (e.g. the CPU 130A) in one or more embodiments. Each of the one or more processors is hardware. The cluster manager 220 may be an apparatus including a processor having programmed instructions (hereinafter, described as a cluster manager 220 having programmed instructions). In some embodiments, a combination of the cluster manager 220 and the client 250 is an apparatus including a processor having programmed instructions (hereinafter, described as a cluster manager 220 having programmed instructions). The instructions may be stored on one or more computer readable and/or executable storage media including non-transitory storage media such as non-transitory storage media in the storage pool 140 with respect to FIG. 1.

Each of the container instances 206 includes a collection of processes. In some embodiments, each of the container instances 206 are allocated CPUs and RAM from the resource pool 215. In some embodiments, the container instances 206 share a common operating system. Each of the container instances 206 can run multiple single-node key-value stores. In some embodiments, the container instances 206 are stand-alone. In some embodiments, the container instances 206 run on VMs.

Each of the vnodes 210 includes a single-node key-value store. In some embodiments, each key-value store is a log-structured-merge (LSM) based key-value store including key-value data structures backed by memory and/or persistent storage. Each key-value store can have a first data structure where data is written sequentially. Each key-value store can have a second data structure where the data is moved to after a predetermined amount of time. The second data structure is implemented as indexed data. The indexed data may include LSM trees. The second data structure may be optimized for reading operations.

The resource pool 215 includes a plurality of compute and memory resources. The resource pool 215 may include a plurality of central processing units (CPUs), such as the CPUs 130, and a plurality of random-access memory banks (RAMs), such as the RAMs 135, with respect to FIG. 1. In some embodiments the CPUs and the RAMs are virtual CPUs and virtual RAMs, respectively, and are associated with physical CPUs and physical RAMs, respectively, of hosts, such as the hosts 105 with respect to FIG. 1. The resource pool 215 may include a plurality of virtual machines (VMs) such as the object VMs (OVMs) 110 with respect to FIG. 1.

The cluster manager 220 includes programmed instructions to create a cluster 205 of multiple containers instances 206 and vnodes 210. In some embodiments, the cluster manager 220 includes programmed instructions to determine an amount of container instances to deploy (e.g. a container number of container instances 206). The cluster manager 220 may determine the amount of container instances 206 by receiving an indication of the amount from the client 250. The cluster manager 220 may include programmed instructions to determine a target throughput, such as a target peak input/output operations per second (TOPS). The target throughput can be included in a request form the client 250. In some embodiments, the target throughput can be based on a scheduled workload of the client 250 historical patterns of workloads from the client 250. In some embodiments, the target throughput can be based on a data storage policy associated with the client 250. The cluster manager 220 may include programmed instructions to determine how many IOPS a container instance 206 can achieve. The cluster manager 220 can determine how many container instances 206 to deploy such that the number of TOPS for the collection of container instances 206 is equal to the target peak IOPS. For example, the cluster manager 220 may include programmed instructions that divide the target peak IOPS by the IOPS per container instance 206 to determine the number of container instances 206 to deploy (referred to herein as a number of "needed" container instances 206). The cluster manager 220 may include programmed instructions to determine an amount of needed compute and memory resources in order to deploy the number of needed container instances 206. The TOPS per container instance 206 may be fixed by policy, or may be requested or reconfigured by the client 250.

In some embodiments, the cluster manager 220 includes programmed instructions to determine an amount of available compute and memory resources. The cluster manager 220 can include programmed instructions to query the resource pool 215 to determine the amount of available compute and memory resources. If the amount of available compute and memory resources is less than the amount of needed compute and memory resources, the cluster manager 220 may include programmed instructions to deploy a number of container instances 206 (lower than the number of needed container instances 206) that can be supported by the amount of available compute and memory resources.

The cluster manager 220 includes programmed instructions to determine an amount of vnodes 210 to deploy (e.g. a node number of vnodes 210). The cluster manager 220 may include programmed instructions to determine an amount of target storage. The target storage amount can be included in a request from the client 250. In some embodiments, the target storage amount can be based on a scheduled workload of the client 250 historical patterns of workloads from the client 250. In some embodiments, the target storage amount can be based on a data storage policy associated with the client 250. The cluster manager 220 can determine how many vnodes 210 to deploy such that the storage amount for the collection of vnodes 210 is equal to the target storage amount. For example, the cluster manager 220 may include instructions that divide the target storage amount by the storage amount per vnode 210 to determine the number of vnodes 210 to deploy (referred to herein as the number of "needed" vnodes 210). The cluster manager 220 may include programmed instructions to determine an amount of needed storage resources in order to deploy the determined number of needed vnodes 210. The storage amount per vnode 210 may be fixed by policy, or may be requested or reconfigured by the client 250.

In some embodiments, the cluster manager 220 includes programmed instructions to determine an amount of available storage resources (e.g. vdisks 235, DAS 145, cloud storage 155, and/or LAN storage 160). The cluster manager 220 can include programmed instructions to query a CVM in the DFS 230 to determine the amount of available compute and memory resources. If the amount of available storage is less than the amount of needed storage resources, the cluster manager 220 may include programmed instructions to deploy a lower number of vnodes 210 that can be supported by the amount of available storage resources.

The cluster manager 220 includes programmed instructions to partition a logical range of the keys (corresponding to the key-value pairs) into multiple key ranges. Each key range includes a group of keys. In some embodiments, the partition is in accordance with consistent hashing, e.g. each key range is an equally sized key range. For example, if the keys are within a logical range from 0 to 9999, the cluster manager 220 can partition the logical range into a first key range from 0 to 4999 and a second key range from 5000 to 9999. The cluster manager 220 may partition the logical range of keys based on a request from a user or based on a policy.

The cluster manager 220 includes programmed instructions to assign a key range to each of the vnodes 210. For example, the cluster manager 220 assign the first key range to the vnode 211A, and assign the second key range to the vnode 211B. In some embodiments, the cluster manager 220 creates a key-vnode mapping data structure that maps each of the vnodes 210 to each of the key ranges. The key-vnode mapping data structure may be an array having an index and a value. The index is equal to a key and the value is equal to a vnode identifier of a vnode that is mapped to the key. In some embodiments, each vnode 210 has an N-byte (NB) key range such that the key range for each vnode 210 is $2^{\wedge}(N*8)$ keys. In some embodiments, the cluster manager 220 stores the key-vnode mapping data structure in the config database 225.

A key is an index at which a corresponding value can be found. In some embodiments, the keys are binary based. In some embodiments, the keys are alphanumeric. A key is a hash of a parameter such as an object parameter, a cluster parameter, a container instance parameter, or a vnode parameter, among others. For example, the key may be determined by taking a hash of a vnode identifier and performing a modulo operation of the hash over a value representing the number of vnodes 210 in the cluster.

The cluster manager 220 includes programmed instructions to distribute the vnodes 210 across the container instances 206. In some embodiments, the distribution is in accordance with consistent hashing, e.g. the cluster manager 220 include programmed instructions to allocate an equal number of vnodes 210 to each container instance 206. In some embodiments, the cluster manager 220 includes programmed instructions to map a container instance 206 to one or more vnodes 210 assigned to the container instance 206. Each vnode 210 may have a corresponding vnode identifier (ID) and each container instance 206 may have a corresponding instance ID. The cluster manager 220 may include programmed instructions to create a data structure including one or more config entries. For each config entry created, the cluster manager 220 may include instructions to include an instance ID in the config entry. The cluster manager 220 may include programmed instructions to add one or more vnode IDs to the config entry. In some embodiments, each config entry includes a cluster identifier, an instance ID, a number of the vnodes 210 allocated to the container instance 206, and one or more vnode IDs, among others. In some embodiments, each config entry includes the key ranges of the respective vnodes 210. In some embodiments, the instance ID is a host name. The cluster manager 220 may include programmed instructions to store the data structure in the config database 225. In some embodiments, each cluster includes a config database 225. In some embodiments, the config database 225 is located in a component, such as the key-value store server 260, external to the clusters In some embodiments, the cluster manager 220 includes programmed instructions to assign a vdisk 235 to a vnode 210. The cluster manager 220 includes programmed instructions to mount vdisks 235 to a container 206 including the vnodes 210 to which the vdisks 235 were assigned, in some embodiments. In some embodiments, the vdisk 235 includes a volume. In some embodiments, the vdisk 235 includes a file system. In some embodiments, the vdisk 235 is backed by the storage pool 140 with respect to FIG. 1. In some embodiments, the vdisk 235 includes an Internet Small Computer System Interface (iSCSI) volume. In some embodiments, each config entry includes contain information on the partition index and the iSCSI volume name that the cluster manager 220 uses to mount the volume to the container instance 206.

The cluster manager 220 includes programmed instructions to deploy the one or more container instances 206. The cluster manager 220 may include programmed instructions to allocate resources, such as CPU and RAM, from the resource pool 215 to a container instance, such as the container instance 206A. The cluster manager 220 may include programmed instructions to deploy the container instances 206A on a VM. The cluster manager 220 may include programmed instructions to deploy the one or more vnodes 210. The cluster manager 220 may include programmed instructions to boot up the vnode 210. The cluster manager 220 may send an alert to a container instance 206 to boot up its vnodes 210. The cluster manager 220 may include programmed instructions to initialize a key-value store instance in each vnode 210.

The cluster manager 220 includes programmed instructions to add one or more of the container instances 206 to a cluster and/or remove one or more of the container instances 206 from a cluster. In some embodiments, the cluster manager 220 includes programmed instructions to rebalance a distribution of the vnodes 210 over multiple container instances 206. The cluster manager 220 may include programmed instructions to update the mapping in the config entries of the data structure. The cluster manager 220 may include instructions to stop existing container instances. The cluster manager 220 may include instructions to unmount vdisks 235 (corresponding to the moved vnodes 210) from the existing container instances 206. The cluster manager 220 may include instructions to mount the vdisks 235 to the new container instances 206 to which the corresponding vnodes 210 have been assigned. The cluster manager 220 may include instructions to restart the existing container instances 206 and to deploy the new container instances 206.

The cluster manager 220 may provide the properties of fault tolerance and high availability for compute and memory resources at the database service level. In some embodiments, the cluster manager 220 includes programmed instructions to determine that a container instance 206 has gone down. For example, the cluster manager 220 may send pings to each of the container instances 206. If a first container instance 206 does not respond to the ping within a predetermined time interval, the cluster manager 220 may determine that the first container instance 206 has gone down. A container instance 206 may go down due to service issues, VM issues, or host issues. In some embodiments, the cluster manager 220 includes programmed instructions to restart the container instance 206 on another VM or host.

A cluster 205 can include more than one cluster manager 220. The cluster manager 220 can scale independently from the container instances 206 in a cluster 205. In some embodiments, the cluster manager 220 runs as a service in a set of container instances 206 which have the property of high availability and can tolerate faults at a cluster level.

The client 250 may be an instance of the OVM 111A with respect to FIG. 1. The client 250 may include an object controller. The object controller may include programmed instructions to receive and serve object requests including requests to create, read, write, and delete. The key-value store server 260 may include programmed instructions to serve 110 requests from the client 250.

The key-value store server 260 may include programmed instructions to serve requests for looking up and updating metadata associated with the I/O request from the object controller. The key-value store server 260 may include programmed instructions to determine a cluster 205 or a container instance 206 in the cluster 205 to which the client 250 can redirect its I/O request. For example, the key-value store server 260 includes a list of keys mapped to instance and cluster information. The instance and cluster information may include a container instance 206 hostname, a cluster 205 hostname, a container instance 206 identifier (ID), a cluster 205 ID, a container instance 206 location, and/or a cluster 205 location. For example, the client 250 may send a request including the key and the key-value store server 260 responds by sending the cluster 205 location where the container instance 206 having the hostname is located. Then, the client 250 may send the I/O request to the cluster 205 associated with the cluster 205 location. In some embodiments, the key-value store server 260 includes the config database 225 described above. In some embodiments, the key-value store server 260 includes the key-vnode mapping data structure described above. In some embodiments, the instance and cluster information may include the key-vnode mapping data structure.

The client 250 and the container instances 206 manage the distribution of the IO requests across multiple vnodes 210. The client 250 may receive an IO request for an object (e.g. a GET command). A object parameter is included in the I/O request (e.g. an object identifier or object name). In some embodiments, the client 250 includes programmed instructions to hash the object parameter to generate a key. The client 250 may include programmed instructions to determine the container instance 206 and/or the vnode 210 that owns the key. For example, the client 250 can send the key to the key-value store server 260 and, in response, receive a location of the container instance 206. The client 250 can may make the determination for multiple I/O requests, thus generating multiple keys. In some embodiments, the client 250 may has a single I/O request to generate multiple keys. Each generated key may fall in the range of a different key range, each key range belonging to a different vnode 210. In some embodiments, the client 250 shards, e.g. distributes, I/O requests across multiple vnodes 210 owning the corresponding keys (and key ranges). For example, the generated keys are "5," "103," "140," and "322." There may be five vnodes: a first vnode owns keys 1-100, a second vnode owns keys 101-200, a third vnode owns keys 201-300, a fourth vnode owns keys 301-400, and a fifth vnode owns keys 401-500. The client 250, in this example, shards the I/O request to the first vnode, the second vnode, and the fourth vnode because the first vnode, the second vnode, and the fourth vnode are the vnodes that own "5," "103," "140," and "322."

In some embodiments, the container instance 206 receives the I/O request destined for one of the vnodes 210 in the container instance 206. In some embodiments, the container instance 206 includes programmed instructions to determine the vnode 210 within the container instance 206 that includes the key. The container instance 206 may make the determination by sending the key or an identifier of the vnode 210 to another component (the config database 225 and/or the key-value store server 260) and receive a location of the vnode 210 or an identifier of the vnode 210. In some embodiments, the container instance 206 can identify the vnode 206 based on the I/O request received from the client 250. The container instance 206 sends the key to the vnode 210, in some embodiments. The vnode 210 can fetch object data or object metadata that is associated with the key (and the object) and send it to the client 250.

The I/O request may include operations such as a PUT (e.g. write) of a key, a GET (e.g. read) of a key, and a SCAN RANGE of a group of keys. The SCAN RANGE may scan (e.g. read) keys between a first specified byte and a last specified byte. The group of keys may be owned by many vnodes 210. In some embodiments, after obtaining the keys associated with a SCAN RANGE request, the client 250 shards the I/O request across multiple vnodes 210 owning the corresponding keys. In some embodiments, the client 250 hashes one or more parameters of the SCAN RANGE request to obtain the keys.

The I/O requests may include performing any transformations on the key-value pairs. For example the cluster manager 220 may compress or encrypt the key-value pairs. Encryption algorithms may include Data Encryption Standard (DES), Advanced Encryption Standard (AES), MD5, SHA1, HMAC, and the like. Compression algorithms may include Discrete Cosine Transform (DCT), Huffman coding, run length encoding (RLE), string-table compression, Lempel Ziv Welch (LZW), and the like.

In some embodiments, the cluster manager 220 receives I/O requests, such as remote procedure calls (RPCs), from the client 250. The cluster manager 220 may include programmed instructions to decode the RPCs to application programming interface (APIs) for key-value pairs and forward the API requests to the appropriate virtual nodes of the key-value store. The cluster manager 220 may include programmed instructions to hash an object in the RPC into one or more keys. The cluster manager 220 can read the key-vnode mapping data structure to determine which vnode 210 a given key is owned by. The cluster manager 220 can shard, or distribute, I/O requests (e.g. object store API calls) across multiple vnodes 210. In some embodiments, the container instance 206 decodes the RPCs to APIs for key-value pairs.

The DFS 230 may include the vdisks 235 and a storage pool, such as the storage pool 140, with respect to FIG. 1. The DFS 230 may include CVMs, such as the CVMs 115 with respect to FIG. 1, on which the vdisks 235 are hosted. The CVMs may be distributed across multiple hosts 105 with respect to FIG. 1. The vdisks 235 are backed by the storage pool, in some embodiments. The vdisks 235 may be instances of the vdisk 120A with respect to FIG. 1. The DFS 230 may include programmed instructions to provide the features of replication, consistency and fault tolerance for the disks on which the vnodes store key-value pairs. Thus, the clusters 205A-N leverage these properties to provide these features without replication at the database level. In some embodiments, the DFS 230 organizes storage entities in a ring-like structure. In some embodiments, the DFS 230 replicates data stored on one storage entity to N−1 number of peers. The N storage entities may be collectively referred to as a storage entity cluster. The storage entities are distributed among different blocks or racks to ensure no two peers are on the same block or rack. In the event of a block or rack failure, there will be at least N−1 copies of data, in some embodiments.

Although two container instances and four vnodes are shown in the cluster 205, in other embodiments, greater or fewer than the two container instances and/or the four vnodes may be used in a cluster 205. Although two vnodes are shown in each of the container instances 206, in other embodiments, greater or fewer than two vnodes can be used in any of the container instances 206. Although four vdisks are shown in the DFS 230, greater or fewer than four vdisks may be used in the DFS 230. Although two clusters are shown in the distributed key-value store 200, greater or fewer than two clusters can be used in the distributed key-value store 200.

Referring now to FIG. 3, an example method 300 for creating a key-value store cluster is shown. The method 300 for creating the key-value store cluster may be implemented using, or performed by, the components of the virtual computing system 100 or the distributed key-value store 200, both of which are detailed herein with respect to FIG. 1 and FIG. 2. The method 300 for creating the key-value store cluster may be implemented using, or performed by, the cluster manager 220, or a processor associated with the cluster manager 220, which is detailed herein with respect to FIG. 2. The method 300 for creating the key-value store cluster may be implemented using, or performed by, a combination of the client 250 and the cluster manager 220, or a processor associated with the combination of the client 250 and the cluster manager 220, which is detailed herein with respect to FIG. 2.

Additional, fewer, or different operations may be performed in the method 300 depending on the embodiment. In some embodiments, the method 300 may be implemented in one or more processing devices (e.g., the processing unit 130A). The one or more processing devices may include one or more devices executing some or all of the operations of the method 300 in response to instructions stored electronically on an electronic storage medium (e.g. the storage pool 140 or the RAM 135A). The one or more processing devices may include one or more devices configured through hardware, firmware, and/or software to be specifically designed for execution of one or more of the operations of the method 300.

A cluster manager, such as the cluster manager 220, determines a container number of container instances to be deployed in a cluster based on compute resources (302). The container number indicates how many members a plurality of container instances consists of. The determination may be based on compute resources. For example, the cluster manager may determine a needed amount of compute resources. The cluster manager may determine whether the needed amount of compute resources is less than an available amount of compute resources. The cluster manager may select the lower amount of the needed amount and the available amount. The cluster manager may create a config entry for each of the container instances to be deployed. In some embodiments, the determination may be based on memory resources.

The cluster manager determines a node number of virtual nodes to be deployed in the cluster based on storage resources (304). The node number of virtual nodes comprises a key-value store. Each of the node number of virtual nodes owns a corresponding key range of the key-value store. The virtual number indicates a size of the group of virtual nodes (e.g. the size is a number of virtual nodes in the group). The determination may be based on storage resources. For example, the cluster manager may determine a needed amount of storage resources. The cluster manager may determine whether the needed amount of storage resources is less than an available amount of storage resources. The cluster manager may select the lower amount of the needed amount and the available amount.

The cluster manager distributes the node number of virtual nodes equally across the container number of container instances (306). In some embodiments, distributing the node number of vnodes across the container number of container instance may include round robin assigning. For example, if there are three container instances and four vnodes created, the first vnode is assigned to the first container instance, the second vnode is assigned to the second container instance, the third vnode is assigned to the third container instance, and the fourth vnode is assigned to the first container instance. The cluster manager may add identifiers of the assigned virtual nodes to the config entries of the container instances to which the virtual nodes were assigned.

The cluster manager deploys the container number of container instances (308). Each container instance may correspond to one of the container instance config entries. Deploying a container instance may include allocating resources from a resource pool to the container instance. Deploying a container instance may include determining a location of the container image (e.g. an index of a registry). Deploying a container instance may include copying the container image from the registry and storing the container image in the virtual memory to be associated with the container instance.

Referring now to FIG. 4, an example method 400 for distributing an I/O request across multiple vnodes is shown. The method 400 may be implemented using, or performed by, the components of the virtual computing system 100 or the distributed key-value store 200, both of which are detailed herein with respect to FIG. 1 and FIG. 2. The method 400 may be implemented using, or performed by, the client 250, or a processor associated with the client 250, which is detailed herein with respect to FIG. 2. The method 400 may be implemented using, or performed by, a combination of the client 250 and the cluster manager 220, or a processor associated with the combination of the client 250 and the cluster manager 220, which is detailed herein with respect to FIG. 2.

The example method 400 may be understood as part of a larger method including the example method 400, or as a stand-alone method. Additional, fewer, or different operations may be performed in the method 400 depending on the embodiment. In some embodiments, the method 400 may be implemented in one or more processing devices (e.g., the processing unit 130A). The one or more processing devices may include one or more devices executing some or all of the operations of the method 400 in response to instructions stored electronically on an electronic storage medium (e.g. the storage pool 140 or the RAM 135A). The one or more processing devices may include one or more devices configured through hardware, firmware, and/or software to be specifically designed for execution of one or more of the operations of the method 400.

A client, such as the client 250, receives an I/O request for an object (402). The client hashes an object parameter of the object to generate a plurality of keys (404). Each key may correspond to a key range of the key-value store. Some keys may fall within the same key range. In some embodiments, the client determines locations of a plurality of vnodes owning the plurality of keys. In some embodiments, the client sends a request, including the plurality of keys, to a key-value store server and, in response, receives the locations of the plurality of vnodes. The client shards the I/O request to the plurality of virtual nodes (406). The plurality of virtual nodes owns the plurality of keys. In some embodiments, the client shards the I/O request to a plurality of container instances including the plurality of nodes owning the plurality of keys. Then, each container instance can send the I/O request to the vnode within the container instance that owns the key. The client receives the object from the plurality of virtual nodes (408).

It is to be understood that any examples used herein are simply for purposes of explanation and are not intended to be limiting in any way.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed:

1. An apparatus comprising a processor having programmed instructions to:
   deploy a container instance providing a compute resource to access metadata indicating a storage location of an object in a distributed storage platform;
   deploy a virtual node implementing a key-value range of a key-value store, wherein the virtual node stores the metadata, wherein the container instance includes the virtual node;
   receive a request to read the object, wherein the request includes the key-value range;
   access, from the virtual node, the metadata using the container instance; and
   provide, to an object controller, the metadata comprising the key-value range, wherein the object controller accesses, via a controller virtual machine (CVM) of a CVM cluster, the object in the storage location according to the metadata, wherein each CVM of the CVM cluster runs a subset of distributed operating system for accessing data in the distributed storage platform and has the key-value range.

2. The apparatus of claim 1, the processor having further programmed instructions to:
   assign the virtual node to a corresponding virtual disk; and
   mount the corresponding virtual disk to the container instance.

3. The apparatus of claim 1, wherein the container instance is part of a cluster of container instances and wherein the virtual node is a part of a plurality of virtual nodes distributed equally across the cluster, the processor having further programmed instructions to:
   add a new container instance in the cluster; and
   rebalance a node number of virtual nodes equally across a container number of container instances and the new container instance.

4. The apparatus of claim 1, the processor having further programmed instructions to:
   determine that the container instance has ceased operating; and
   restart the container instance on a new virtual machine.

5. The apparatus of claim 1, the processor having further programmed instructions to store a mapping of the virtual node to the container instance.

6. The apparatus of claim 1, the processor having further programmed instructions to:
   in response to the request to read the object, hash an object parameter to generate a key that corresponds to the key range of the key-value store; and
   shard the I/O request to a plurality of virtual nodes including the virtual node.

7. The apparatus of claim 6, the processor having further programmed instructions to receive the object from the virtual node.

8. A non-transitory computer readable storage medium having instructions stored thereon that, upon execution by a processor, causes the processor to perform operations comprising:
   deploying a container instance providing a compute resource to access metadata indicating a storage location of an object in a distributed storage platform;
   deploying a virtual node implementing a key-value range of a key-value store, wherein the virtual node stores the metadata, wherein the container instance includes the virtual node;
   receiving a request to read the object, wherein the request includes the key-value range;
   accessing, from the virtual node, the metadata using the container instance; and
   providing, to an object controller, the metadata comprising the key-value range, wherein the object controller accesses, via a controller virtual machine (CVM) of a CVM cluster, the object in the storage location according to the metadata, wherein each CVM of the CVM cluster runs a subset of distributed operating system for accessing data in the distributed storage platform and has the key-value range.

9. The storage medium of claim 8, the operations further comprising:
   assigning the virtual node to a corresponding virtual disk; and
   mounting the corresponding virtual disk to the container instance.

10. The storage medium of claim 8, wherein the container instance is part of a cluster of container instances and wherein the virtual node is a part of a plurality of virtual nodes distributed equally across the cluster, the operations further comprising:
    adding a new container instance in the cluster; and
    rebalancing a node number of virtual nodes equally across a container number of container instances and the new container instance.

11. The storage medium of claim 8, the operations further comprising:
    determining that the container instance has ceased operating; and
    restarting the container instance on a new virtual machine.

12. The storage medium of claim 8, the operations further comprising storing a mapping of the virtual node to the container instance.

13. The storage medium of claim 8, the operations further comprising:
    in response to the request to read the object, hashing an object parameter to generate a key that corresponds to the key range of the key-value store; and
    sharding the I/O request to a plurality of virtual nodes including the virtual node.

14. The storage medium of claim 13, the operations further comprising receiving the object from the virtual node.

15. A computer-implemented method comprising:
deploying, by the processor a container instance providing a compute resource to access metadata indicating a storage location of an object in a distributed storage platform;
deploying, by the processor, a virtual node implementing a key-value range of a key-value store, wherein the virtual node stores the metadata, wherein the container instance includes the virtual node;
receiving, by the processor, a request to read the object, wherein the request includes the key-value range;
accessing, by the processor and from the virtual node, the metadata using the container instance; and
providing, to an object controller, the metadata comprising the key-value range, wherein the object controller accesses, via a controller virtual machine (CVM) of a CVM cluster, the object in the storage location according to the metadata, wherein each CVM of the CVM cluster runs a subset of distributed operating system for accessing data in the distributed storage platform and has the key-value range.

16. The method of claim 15, further comprising:
assigning, by the processor, the virtual node to a corresponding virtual disk; and
mounting the corresponding virtual disk to the container instance.

17. The method of claim 15, wherein the container instance is part of a cluster of container instances and wherein the virtual node is a part of a plurality of virtual nodes distributed equally across the cluster, further comprising:
adding, by the processor, a new container instance in the cluster; and
rebalancing, by the processor, a node number of virtual nodes equally across a container number of container instances and the new container instance.

18. The method of claim 15, further comprising:
determining, by the processor, that the container instance has ceased operating; and
restarting, by the processor, the container instance on a new virtual machine.

19. The method of claim 15, further comprising storing, by the processor, a mapping of the virtual node to the container instance.

20. The method of claim 15, further comprising:
in response to the request to read the object, hashing, by the processor, an object parameter to generate a key that corresponds to a key range of the key-value store; and
sharding, by the processor, the I/O request to a plurality of virtual nodes including the virtual node.

* * * * *